US011199123B1

(12) United States Patent
Lemberg et al.

(10) Patent No.: US 11,199,123 B1
(45) Date of Patent: Dec. 14, 2021

(54) COOLING SYSTEM AND RIM DRIVEN FAN FOR ENGINE COOLING

(71) Applicant: BAE Systems Controls Inc., Endicott, NY (US)

(72) Inventors: Nicholas A. Lemberg, Vestal, NY (US); Kolin Arnold, Vestal, NY (US); Richard C. Sutphin, Apalachin, NY (US)

(73) Assignee: BAE Systems Controls Inc., Endicott, NY (US)

( * ) Notice: Subject to any disclaimer, the term of this patent is extended or adjusted under 35 U.S.C. 154(b) by 0 days.

(21) Appl. No.: 16/938,336

(22) Filed: Jul. 24, 2020

(51) Int. Cl.
*F04D 25/06* (2006.01)
*H02K 9/06* (2006.01)
*F04D 29/00* (2006.01)
*F01P 7/04* (2006.01)
*F01P 5/04* (2006.01)

(52) U.S. Cl.
CPC ............. *F01P 7/048* (2013.01); *F01P 5/04* (2013.01); *F04D 25/06* (2013.01); *F01P 2005/046* (2013.01)

(58) Field of Classification Search
CPC ........ H02K 9/06; H02K 5/1732; H02K 7/083; H02K 5/1735; H02K 21/24; F04D 29/281; F04D 29/056; F04D 29/059; F04D 29/263; F04D 19/002
See application file for complete search history.

(56) References Cited

U.S. PATENT DOCUMENTS

| 6,565,321 | B1 * | 5/2003 | Illingworth | ........... B64C 11/001 |
| | | | | 416/185 |
| 8,299,669 | B2 | 10/2012 | Gieras et al. | |
| 10,450,063 | B1 * | 10/2019 | Randall | ................. B64C 29/02 |
| 2001/0048877 | A1 * | 12/2001 | Illingworth | ............. B64C 27/20 |
| | | | | 415/208.2 |
| 2016/0238011 | A1 * | 8/2016 | Lambert | ................ F04D 25/08 |
| 2018/0179894 | A1 * | 6/2018 | Blackwell | ............... F16C 35/06 |
| 2019/0260267 | A1 * | 8/2019 | Diemunsch | ............. H02K 9/04 |
| 2019/0393763 | A1 * | 12/2019 | Menheere | ............. F04D 25/045 |

OTHER PUBLICATIONS https://en.wikipedia.org/wiki/Tip-magnetic_driving, printed Jul. 24, 2020.
https://en.wikipedia.org/wiki/Rim-driven_thruster, printed Jul. 24, 2020.

* cited by examiner

*Primary Examiner* — Long T Tran
(74) *Attorney, Agent, or Firm* — Scully Scott Murphy & Presser PC

(57) ABSTRACT

A system for cooling an engine is provided. The system uses a rim driven fan having an electric motor in a frame of the fan to move air through a radiator toward the outside of the vehicle. The electric motor may have the rotor and the stator axially or radially aligned. The plurality of fan blades extends radially inward of a support which is formed integral with or attached to the rotor. Rim driven fans are also provided.

19 Claims, 8 Drawing Sheets

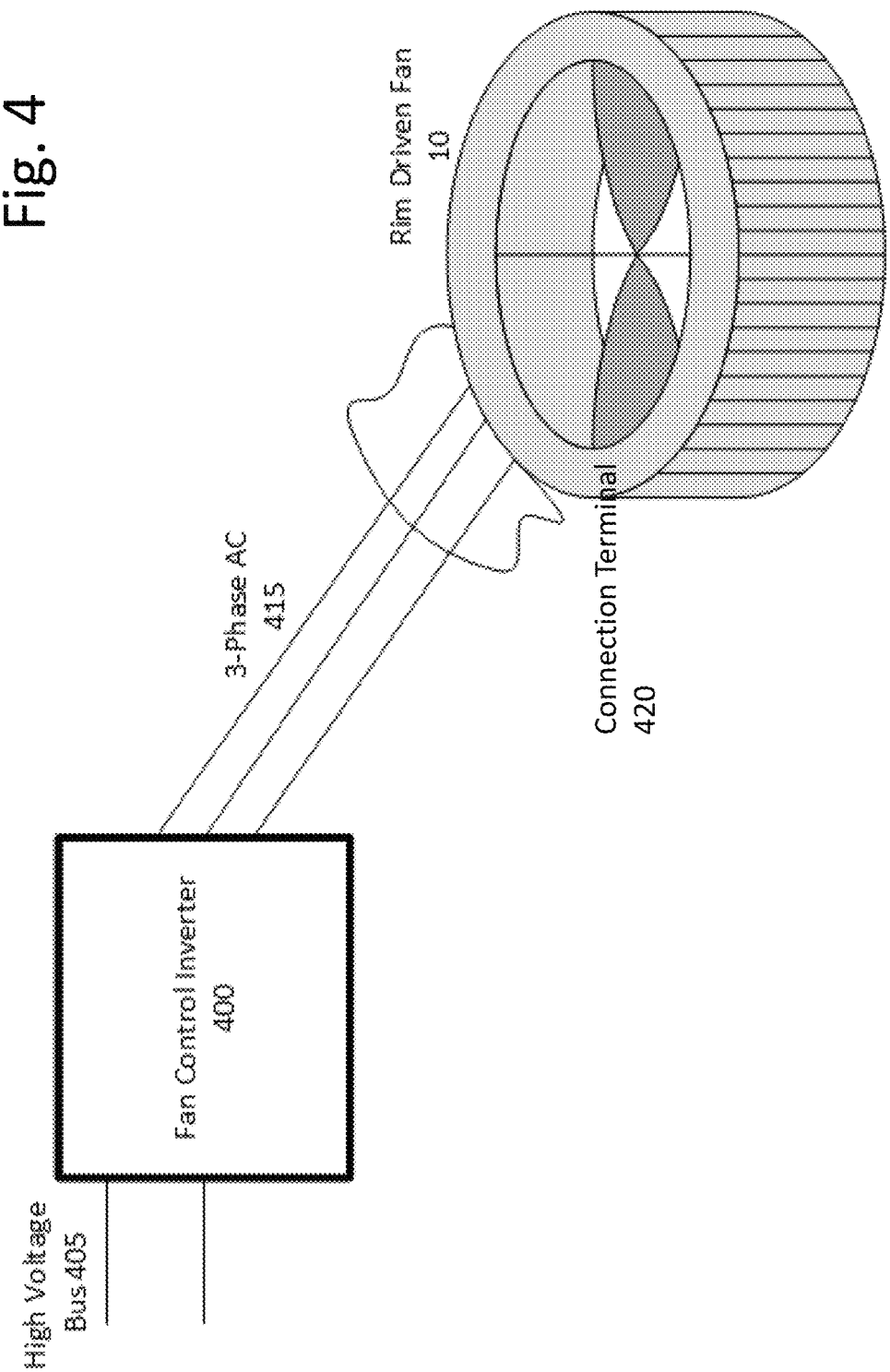

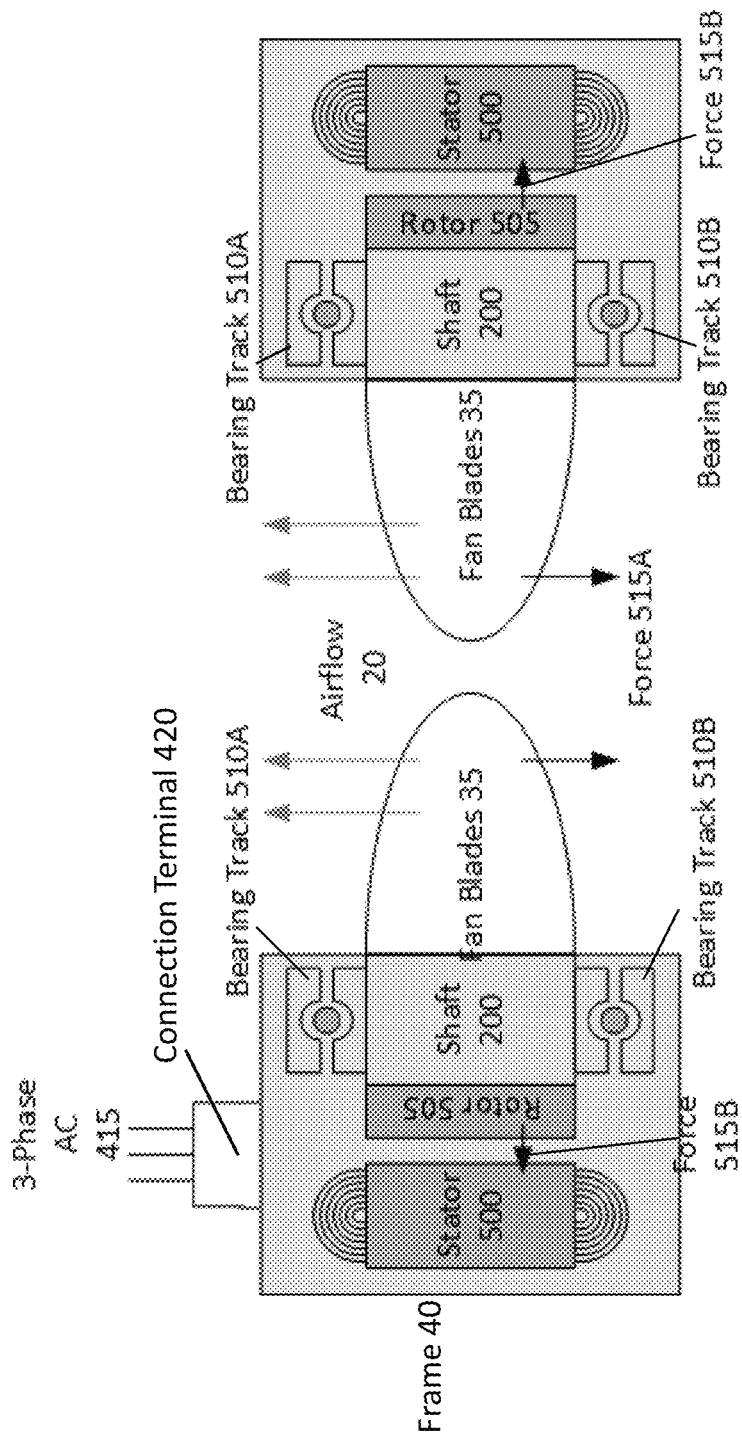

COOLING SYSTEM AND RIM DRIVEN FAN FOR ENGINE COOLING

FIELD OF THE DISCLOSURE

This disclosure relates to a system for cooling an engine using a rim driven fan. This disclosure also relates to rim driven fans.

BACKGROUND

Engines are typically cooled using a radiator system having a fan moving airflow through radiator and plenum. One known fan uses a hydraulic motor(s). However, hydraulic motors are extremely energy dense. Additionally, the hydraulic motor(s) are positioned inside the radiator plenum on the hot side of the radiator.

Other known fans may use electric motor(s). The electric motors have central hubs where the mechanical and electrical components of the fan are located within the central hub. The fan blades extend radially outward from the central hub. However, when the mechanical and electrical components are located in this position, the components are exposed to the hot airflow moving through the radiator plenum from the engine as the motor is positioned inside the radiator plenum on the hot side of the radiator.

SUMMARY

Disclosed is a cooling system for cooling an engine. The system comprises a rim driven fan. The rim driven fan comprises a fan frame. The fan frame comprises an electric motor. The electric motor drives the fan blades.

The electric motor comprises an annular rotor rotatably mounted within the fan frame and a stator also mounted within the fan frame. The stator is configured to provide torque to rotate the annular rotor which in turn rotates the fan blades that are attached to or integrally formed with an annular support, using power received from a power source.

In an aspect of the disclosure, the fan blades extend radially inward from the annular support such that at least a portion of the fan blades are external to the fan frame.

The rim driven fan may be mounted to a frame of a radiation plenum such that the electric motor is not located inside the radiator plenum and is not exposed to the hot air.

The system further comprises a processor configured to supply power to the stator from the power source to rotate the annular rotor causing the plurality of fan blades to rotate whereby air is moved through a radiator and radiator plenum.

In an aspect of the disclosure, the fan frame further comprises a first bearing track and a second bearing track. Each track comprises a plurality of bearings. Each bearing track comprises a first wall and a second wall. A portion of the bearing tracks rotate with the annular rotor.

In an aspect of the disclosure, the first wall and the second wall may be aligned in the direction of airflow.

In an aspect of the disclosure, the power may be three-phase AC. In this aspect, the system may further comprise an inverter. The inverter may be electrically coupled to a DC bus. The inverter may have three pairs of switching elements, one switching pair for each of the three-phases. The processor may control the speed of the annular rotor, the annular shaft and the plurality of fan blades by adjusting the frequency of switching of the switching elements and duty cycle.

In an aspect of the disclosure, the speed of the fan blades may be adjusted based on a temperature of the engine and/or plenum.

In an aspect of the disclosure, the system may be installed in an electric vehicle and a hybrid electric vehicle. When the system is installed in either an electric vehicle or a hybrid electric vehicle, an energy storage system may supply power to the DC bus.

In an aspect of the disclosure, the annular rotor and stator may be radially aligned or axially aligned. When the annular rotor and stator are axially aligned, the stator comprises a first portion and a second portion. The annular rotor may be between the first portion and the second portion in the direction of airflow.

Also disclosed is a rim driven fan. The rim driven fan may comprise a frame, an annular rotor, a stator, a plurality of fan blades, at least one annular support, and bearing tracks. The annular rotor, the stator, the at least one annular support and the bearing tracks may be located within the frame. The stator is configured to provide torque to rotate the annular rotor, the at least one annular support and the fan blades. The stator may comprise a first portion and a second portion. The annular rotor may be positioned between the first portion and the second portion in an axial direction.

Each bearing track comprises a plurality of bearings, a first wall and a second wall. In an aspect of the disclosure, the first wall and the second wall are axially aligned.

In an aspect of the disclosure, the annular rotor may be positioned between the first bearing track and the second bearing track in the axial direction. However, the annular rotor may be offset of the bearing tracks in a radial direction. The rim driven fan further comprises a power terminal on the frame configured to receive power from a power source. The received power is supplied to the stator.

In an aspect of the disclosure, the plurality of fan blades may be formed integral with one of the annular supports and extend radially inward, such that at least a portion of the fan blades are external to the frame.

In other aspects of the disclosure, the fan blades may be removably attached to the annular support to permit maintenance of the fan blades or replacement.

In some aspects, the bearing tracks may sandwich one of the annular shafts in the axial direction, where one of the walls of the bearing tracks contact the annular shaft and may rotated therewith.

In some aspects of the disclosure, the bearings may be thrust bearings. In other aspects of the disclosure, the bearing tracks may be magnetic.

In an aspect of the disclosure, an inner wall of the fan frame has an opening such as a slit for the plurality of fan blades to rotate.

Also disclosed is a rim driven fan which may comprise a frame, an annular rotor rotatably mounted within the frame; an annular support attached to or integral with the annular rotor, a plurality of fan blades, a stator, bearing tracks and a power terminal. The fan blades may extend radially inward from the annular support, where at least a portion of the plurality of fan blades are external to the frame. The stator may be mounted within the frame and may be configured to provide torque to rotate the annular rotor. The annular rotor may be between the stator and the annular support in a radial direction. Each bearing track which is mounted within the frame may comprise a plurality of bearings. Each bearing track may comprise a first wall and a second wall. The first wall and the second wall may be aligned in the radial direction. The first wall may be in contact with the annular support and configured to rotate with the annular support.

The power terminal may be on the frame and may be configured to receive power from an external power source. The received power may be supplied to the stator.

BRIEF DESCRIPTION OF THE DRAWINGS

FIG. 4 is a diagram of a rim driven fan with a control inverter in accordance with aspects of the disclosure;

FIG. 5A is a sectional view of a fan where the electric motor has a radial alignment in accordance with aspects of the disclosure;

DETAILED DESCRIPTION

Figure 1:
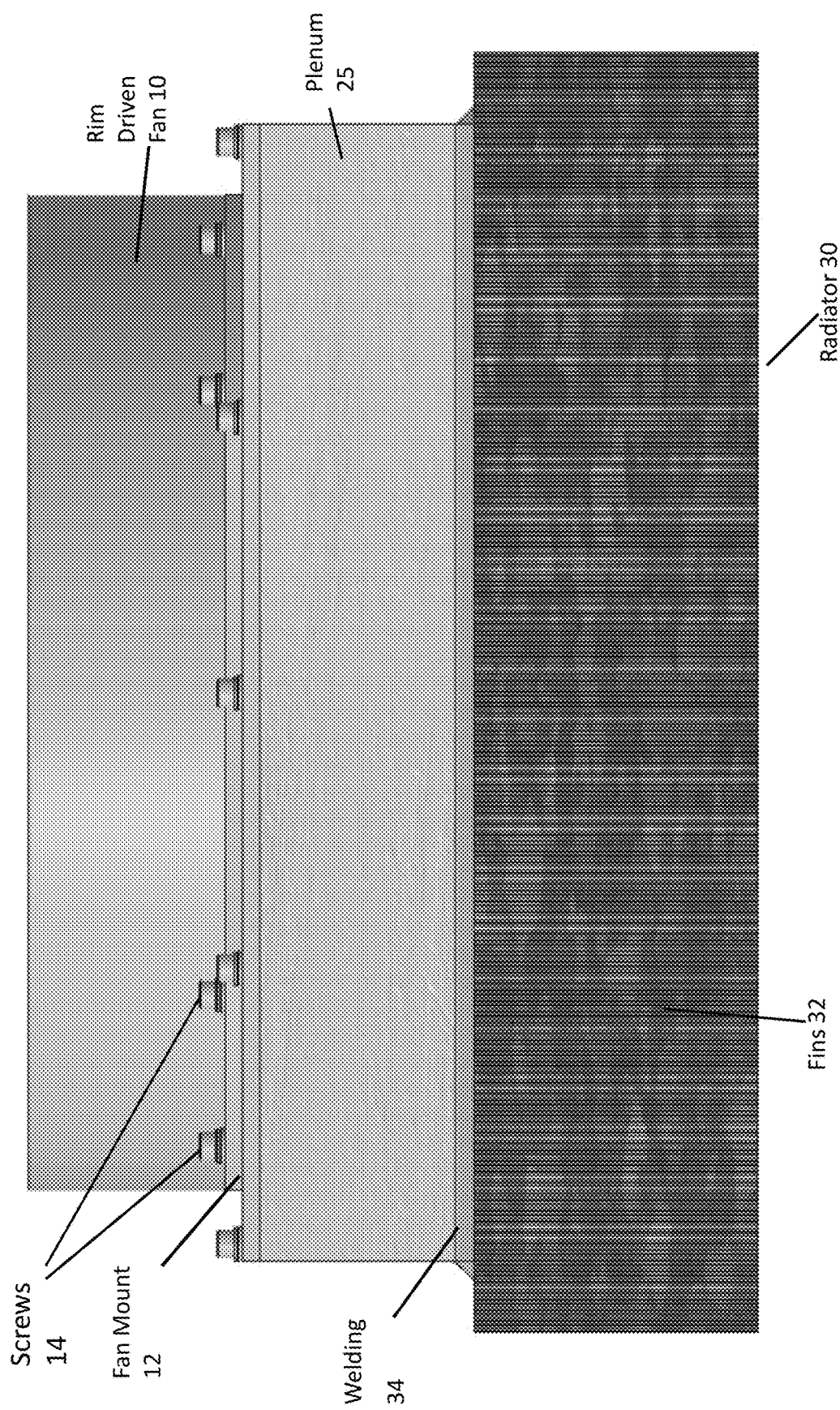
FIGS. 1 and 2 are views showing a rim driven fan mounted to a frame of a radiator plenum in accordance with aspects of the disclosure.
Figure 2:
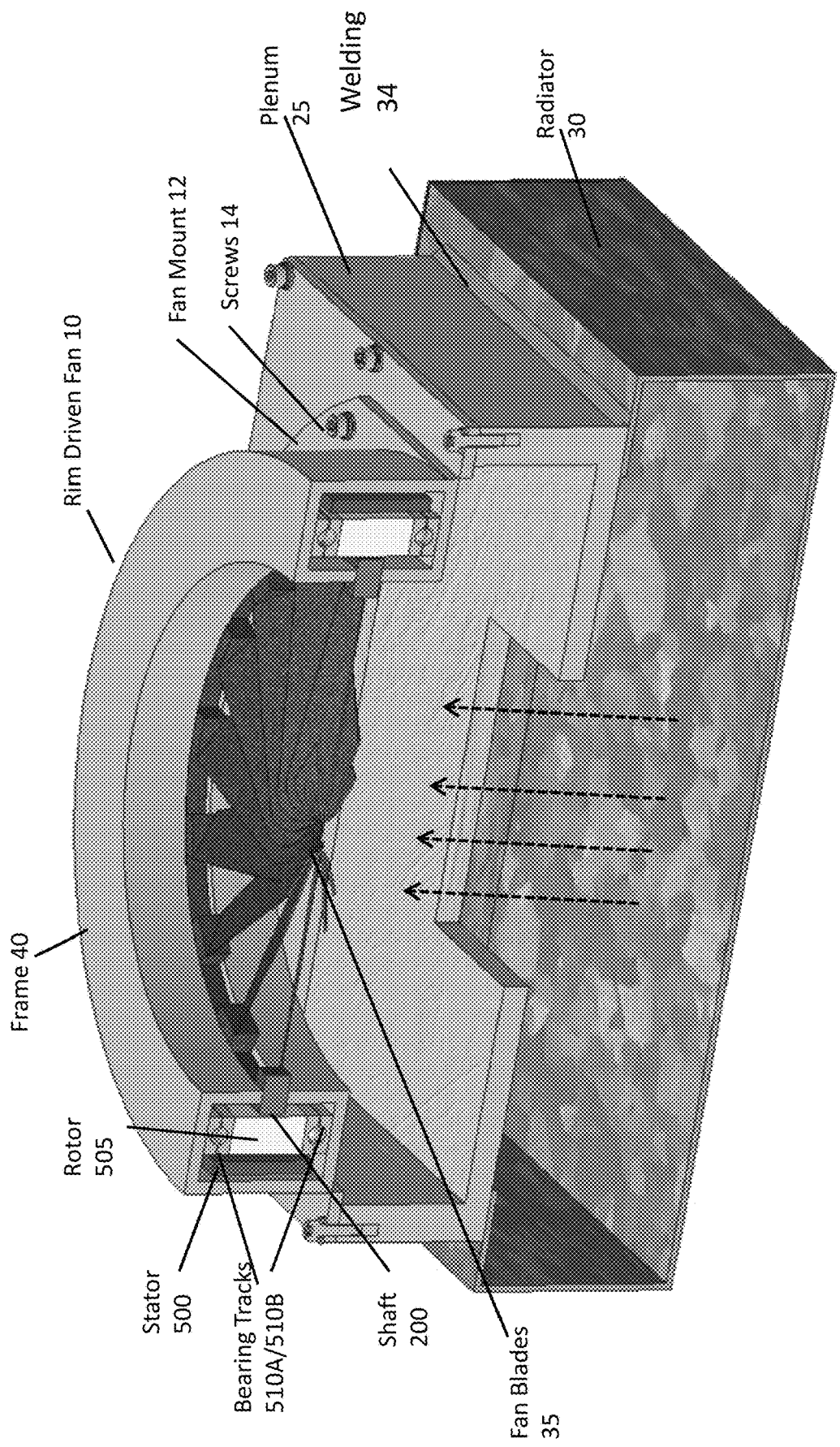
Figure 5B:
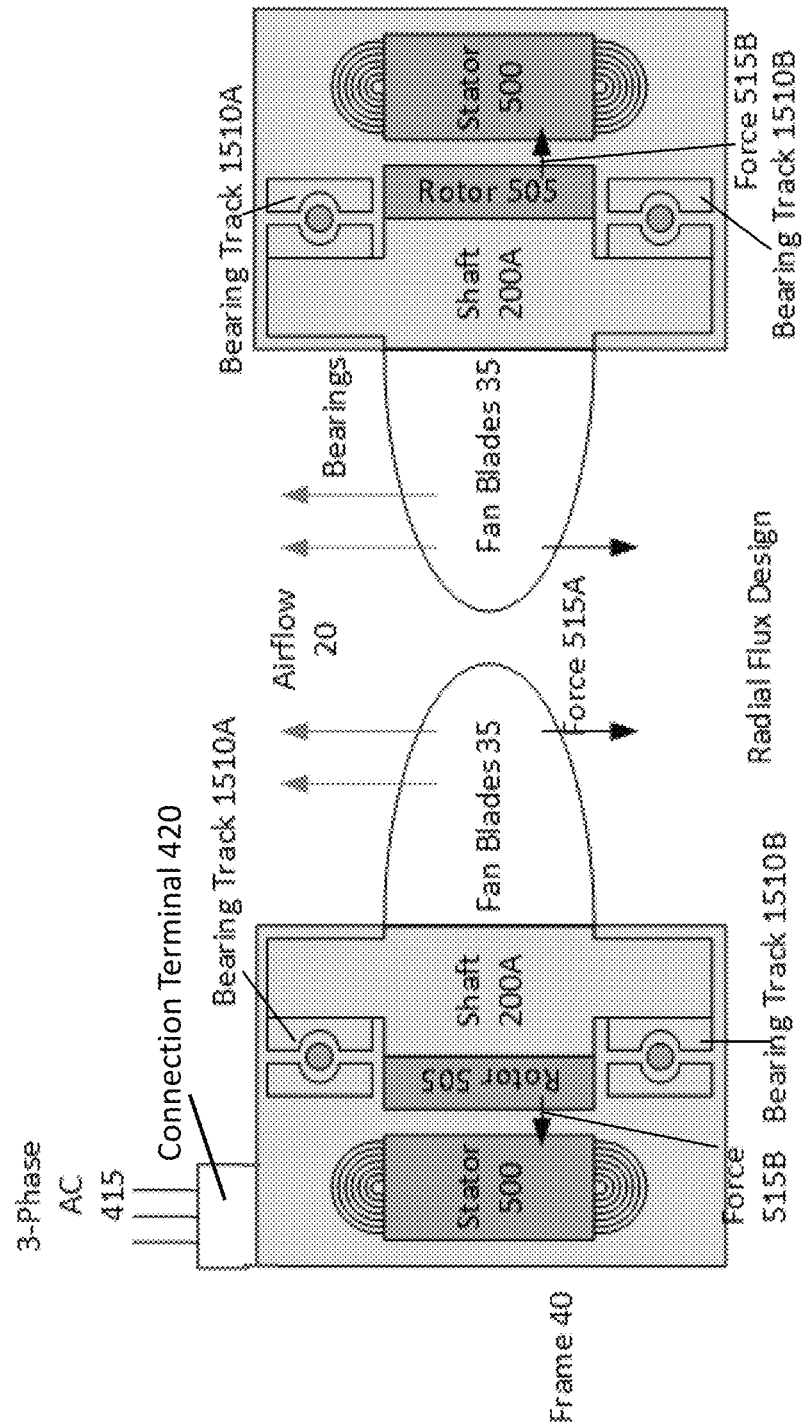
FIG. 5B is a sectional view of another fan where the electric motor has a radial alignment in accordance with aspects of the disclosure.

In accordance with aspects of the disclosure a rim driven fan (RDF) 10 may be used to cool engines in various types of vehicles, such as, but not limited to, a car, a bus, a truck, a boat, a motorcycle, UAV, UUV or airplane. FIGS. 1 and 2 show views of the RDF 10 mounted to a plenum 25 of a radiator system via its frame 40 and fan mount 12 of one example configuration of a RDF. However, as described in herein, a RDF in accordance with different aspects of the disclosure may have different configurations. For example, as shown in FIG. 2, rotor is in contact with a wall of the bearing tracks (also referred to herein as bearing raceway). However, in other configurations, such as shown in FIGS. 5A and 5B, the shafts/supports may contact a wall of the bearing raceway. FIG. 2 is a sectional perceptive view of the system showing certain components of the fan and the direction of airflow.

The frame 40 is mounted to the frame of the radiator plenum 25. In an aspect of the disclosure, bolts or screws 14 may be inserted into openings of the frame of the radiator plenum and the frame 40 of the RDF 10. For example, as shown in FIG. 2, the frame 40 includes a mounting collar 12 (fan mount). The screws 14 are inserted into openings in the mounting collar 12 for mounting the RDF 10 to the radiator plenum 25. The radiator plenum 25 is welded to the radiator 30 (welding 34). The radiator 30 has a plurality of fins 32 for cooling. (the fins are not shown in FIG. 2 to allow for better showing of the airflow, which is depicted by four dashed arrows). The direction of airflow in FIG. 2 is upward.

The radiator 30 is connected to the engine and cylinder head via liquid channels. These channels having liquid, e.g., coolant, pumped therein. One channel is for the hot liquid from the engine and the other is a return for cooled liquid (the channels are not shown in the figures). The liquid is circulated via a pump. The hot liquid moves through the fins 32 within the radiator. The fins 32 have a high surface area which allows the hot liquid to cool when air flows through the radiator 30 and the radiator plenum 25 to the outside. The heat is transferred to the airflow and subsequently cooled by the RDF 10. For example, the RDF 10 causes the airflow to be pulled through the radiator 30 and plenum 25 toward the outside.

The frame 40 may have an annular shape (FIG. 2 depicts the frame as semi-circular since it is a sectional view). However, in other aspects of the disclosure, the frame 40 may be other shapes such as a square. For example, the corners, e.g., each 90 offset portion of the frame may have a wider section. This may facilitate mounting. For example, mounting bolts may be inserted into these sections.

The frame 40 encloses the mechanical components such as the bearing tracks and an electric motor (and associated wiring). However, the inner wall of the frame has a slit around the annular shape to allow for the fan blades 35 to project inward from the frame 40 and rotate. The height of the slit may be sufficient to provide clearance for the blades and the blades to rotate without causing friction.

The frame 40 may be formed from a single piece of material. However, in other aspects of the disclosure, the frame may be formed from multiple pieces, such as two, to allow access to the components for maintenance and component replacement. For example, the inner wall having the slit may be attached to a U-shaped frame.

Advantageously, since the frame 40 of the RDF 10 is mounted to the frame of the plenum 25 as depicted in FIG. 2, the frame 40 is separate and outside the path of the airflow 20. The RDF 10 is located on the hot side of the radiator and 30 and plenum 25. This in turn allows for the electric motor, e.g., stator and rotor, not to be exposed to the hot airflow 20.

Figure 3B:
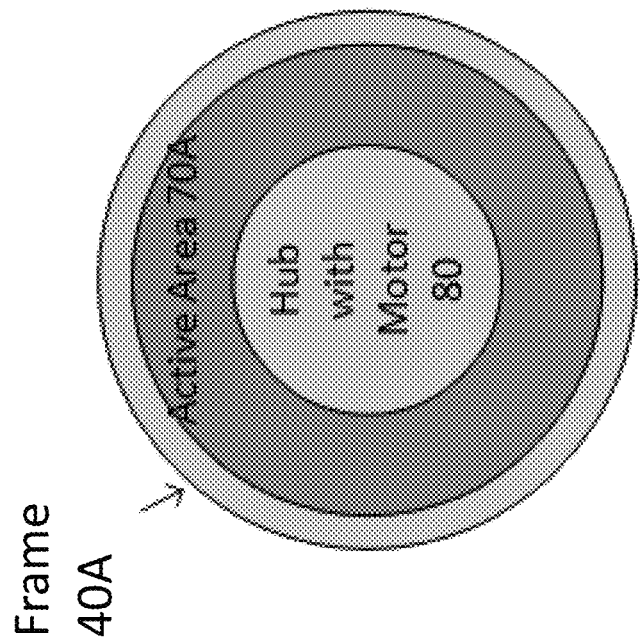
FIGS. 3A and 3B show a comparison of the active area of rim driven fan (FIG. 3A) verses a central hub driven fan where a motor is positioned in the central hub (FIG. 3B).
Figure 3A:
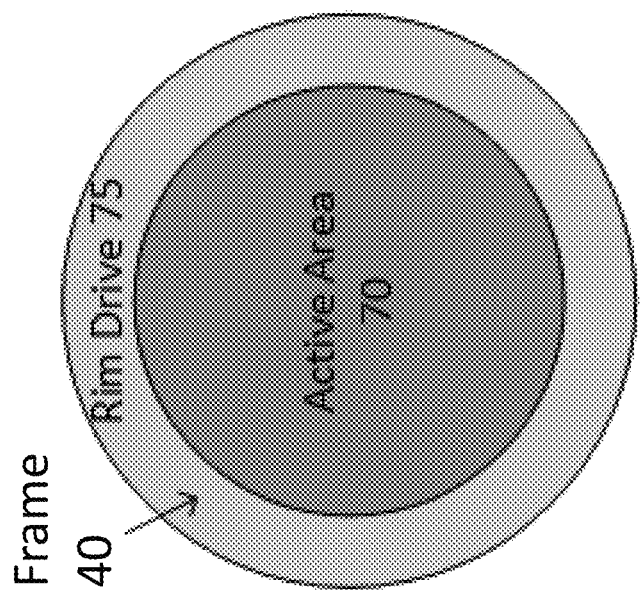

Another advantage of using a RDF 10 versus a central hub driven fan for the system is the active area 70 is larger in the RDF 10 for the same size fan. FIG. 3A depicts the active area 70 for a rim drive 75 (RDF 10) and FIG. 3B depicts the active area 70A for a fan having a central hub with the motor 80, e.g., central hub driven.

The active area for a RDF 10 is given by:

$$\text{Active Area} = \pi * r_{FanBlades}^2 \qquad (1)$$

The active area for a fan having a central hub with the motor 80, e.g., central hub driven is given by:

$$\text{Active Area} = \pi * r_{FanBlades}^2 - \pi * r_{Hub}^2 \qquad (2)$$

Since the central hub in the fan occupies the space where fan blades are in the RDF 10, the active area is larger in the RDF 10 although the frame 40A may be thinner than the frame 40 in the RDF 10.

The electric machine depicted in FIG. 2 has a radial alignment. However, in other aspects of the disclosure, the electric machine may have other alignments. Additionally, in FIG. 2, the walls of the bearing tracks are axially aligned. However, in other aspects of the disclosure, the walls of the bearing tracks may be radially aligned. Additionally, FIG. 2 depicts the bearing tracks in contact with the rotor 505, however, in other aspects of the disclosure, the bearing tracks may contact one or more of the shafts (supports).

FIG. 4 illustrates an example of the RDF 10 and power inputs. In FIG. 4 only a subset of the fan blades are shown. The line represents additional fan blades as seen from their edge. Power to the RDF 10 is supplied via a fan control inverter 400. The fan control inverter 400 comprises three pairs of switching elements (not shown). One pair for each phase of AC, e.g., three-phase AC. The switching elements may be MOSFETs which are gate driven.

In an aspect of the disclosure, a processor controls the switching elements. For example, the processor controls the frequency of the switching and duty cycle to change the speed of the rotor 505/505A and fan blades 35 to achieve a target RPM. In an aspect of the disclosure, the target RPM may be 6000 RPM or higher. However, other target speeds may be achieved. This disclosure is not limited to the example. The processor may be a microcontroller or microprocessor or any other processing hardware such as a CPU or GPU or FPGA. In an aspect of the disclosure, the processor acts as a gate driver.

In an aspect of the disclosure, the processor may be incorporated into the fan control inverter 400. In other aspects of the disclosure, the processor may be external to the fan control inverter 400. The fan control inverter 400 outputs a three-phase AC 415 to the RDF 10 via a connection terminal 420. The external wiring within the frame 40 may route the three-phase AC 415 to a circuit board and the stator 500 or 500A. Another advantage of the RDF 10 is that the electric cabling and the connection terminal 420 are separate from and not exposed to the hot airflow 20, and the cabling and the connection terminal 420 do not need to be routed through the radiator plenum 25.

The fan control inverter 400 is connected to a high voltage bus 405. In an aspect of the disclosure, the bus voltage may exceed 600 VDC, such as, but not limited to 610 VDC. However, other bus voltages may be used. This disclosure is not limited to the example. For example, the value of the high voltage bus 405 may be based on the type of vehicle, size of the engine, etc. For example, when the system is installed in an electric vehicle, an energy storage system (ESS) may define the value of the high voltage DC link. Similarly, when the system is installed in a hybrid electric vehicle (HEV), the energy storage system (ESS) may define the value of the high voltage DC link.

In other aspects, an electric generator may be coupled to a power takeoff (PTO) of the engine and the three-phase output of the generator is coupled to another inverter to create the high voltage bus 405.

In other aspects of the disclosure, the fan control inverter 400 may be incorporated into an accessory power system (APS), e.g., as part of another inverter system, and not a standalone inverter.

FIG. 5A is a sectional view of the RDF 10 showing the electric motor radially aligned. In accordance with aspects of the disclosure, the rotor 505 and stator 500 may both be mounted within the frame 40. The rotor 505 is rotatably mounted within the frame 40. The rotor has a shape of a disc. In an aspect of the disclosure, the rotor may be made of a magnetic steel lamination. The rotor may have windings or permanent magnets. A shaft 200 (also refers to herein as support) may be attached to or formed integral with the rotor 505. The shaft 200 provides support for the fan blades 35. The shaft may be formed from steel.

In an aspect of the disclosure, the shaft 200 may sandwiched between bearing tracks (raceways) 510A and 510B. Each bearing track (raceway) has two walls. One of the walls is mounted to the frame 40, e.g., fixed. The other wall, which is in contact with the shaft 200, is free to rotate with the rotor 505 and shaft 200 (since the shaft is attached to or integral with the rotor). In an aspect of the disclosure, the wall of the tracks (raceways) 510A and 510B may be axially aligned, e.g., aligned in the direction of airflow. Since the walls are axially aligned, the length of the walls is the same. The direction of airflow 20 is shown in FIG. 5A with four arrows (going upward in the figure). The bearing tracks (raceways) 510A and 510B extend around the annular frame. A plurality of bearings may be located within the bearing tracks (raceways) 510A and 510B. In an aspect of the disclosure, the bearings are thrust bearings. In some aspect, fluid bearings may be used.

In an aspect of the disclosure, the raceways may be magnetic. Where magnetic raceways are used, the raceways may be connected to a power source to generate an electromagnetic field.

Since FIG. 5A is a sectional view, only four balls/rollers are shown, however, the number of balls/rollers is not limited to four.

In an aspect of the disclosure, the fan blades 35 extend radially inward of the shaft 200. For example, the fan blade 35 may be formed integral with the shaft 200. In other aspects, the fan blades 35 may be attached to the shaft 200. In other aspects of the disclosure, the shaft 200 may have thicker portions where the fan blades 35 may be attached and the fan blades 35 are mounted to the thicker portions. When the rotor 505 rotates, the fan blades 35 rotate in conjunction with the rotor 505 and shaft 200. In other aspects, the fan blades may be removably attached to the shaft 200, such as with screws or bolts. The ability to remove the fan blades 35 individually facilities maintenance of the fan and/or replacement of a fan blade without having to replace the entire RDF 10.

The connection terminal 420 connecting to the three-phase AC 415 (3-phase AC) is depicted in FIG. 5A (on top in the figure). As can be seen, the connection terminal 420 is not along the path of the airflow 20.

There is a gap between the stator 500 and rotor 505. The size of the gap impacts the electrical performance of the motor.

The stator 500 comprises a core and a plurality of coils. In an aspect of the disclosure, the coils extend around the frame 40. The coils may be interleaved or individually wound. The core is mounted to the frame 40 by any appropriate means.

The number of turns and locations of the coils is set such that the rotor 505 may rotate at a high RPM.

Since the rotor 505 is incorporated in the frame 40, the rotor has a larger diameter than the rotor in a fan having a central hub with the motor 80, e.g., central hub driven. Therefore, the electric motor in the RDF 10 may generate higher torque.

FIG. 5A also depicts the force 515A on the fan blades 35 by the airflow 20, represented by two arrows. The force 515A exerted by the airflow 20 is in the opposite direction of the direction of airflow (downward in the figure), e.g., axial force. However, the force 515B exhibited on the rotor 505 (by the stator 500) is radial, represented by two arrows pointed outward (left and right in the figure). Therefore, the force exerted by the airflow 515A and the force exerted by the stator 515B are orthogonal to each other, which may put a strain on the RDF 10.

FIG. 5B is a sectional view of another RDF 10 having a radially aligned electric motor. A difference in the RDF 10 in FIG. 5A and FIG. 5B, is the orientation and type of bearing tracks 1510A and 1510B and the shaft 200A (support). The shaft 200A is extended in the axial direction verses shaft 200. This extension enables the orientation of the bearing tracks (raceways) 1510A/B to be rotated. In FIG. 5B, the walls of the bearing tracks are radially aligned. One of the walls of the bearing track (raceway) 1510A/B is in contact with the extended portion of the shaft 200A and is able to rotate with the shaft 200A (and rotor 505). The other wall is fixed, e.g., mounted to the frame 40. As depicted in FIG. 5B, the bearings are ball bearings.

Figure 6:
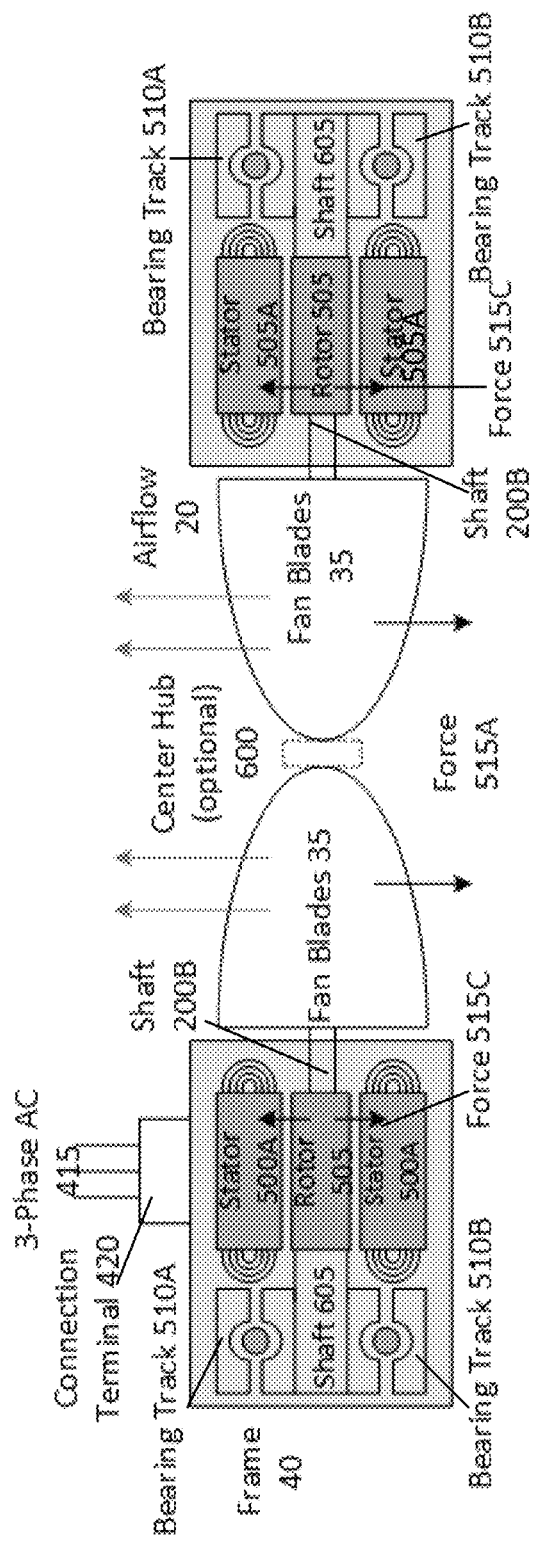
FIG. 6 is a sectional view of a fan where the electric motor has an axial alignment in accordance with aspects of the disclosure.
Figure 7:
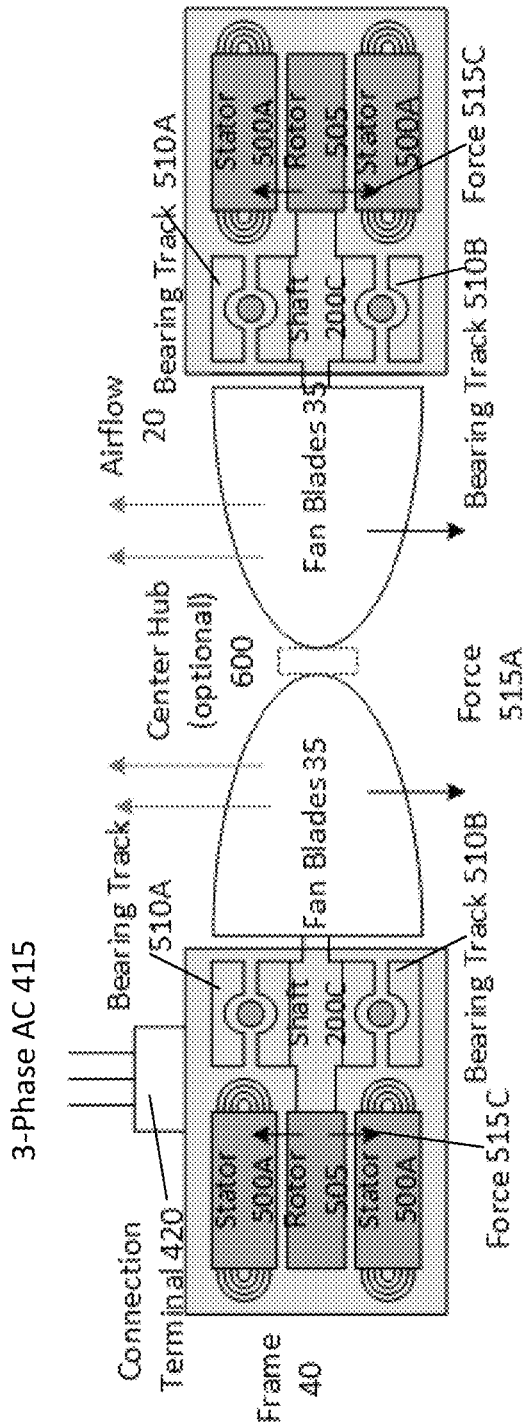
FIG. 7 is sectional view of another fan where the electric motor has an axial alignment in accordance with aspects of the disclosure.

FIGS. 6 and 7 depict RDFs 10 having a different electric motor orientation than the RDF 10 in FIG. 5A and FIG. 5B. The electric motor orientation in FIGS. 6 and 7 are axial. As depicted, the stator 500A and rotor 505A are axially aligned.

Here, the stator is divided into two symmetric parts. Each part comprises a core and a plurality of coils. Similar to above, the coils may extend around the frame 40. The number of coils and structure of the windings may be different for the axial alignment than the radial alignment. The rotor 505A may be between the two parts in the direction of airflow 20 (axial direction), which in FIG. 6 is upward (represented by four arrows).

In accordance with aspects of the disclosure, the frame 40 may also include a shaft 605 (another support). The shaft 605 may be attached to the rotor 505A or integral with the rotor 505A, where the shaft 605 is an extended section of the rotor 505A. The shaft 605 supports the rotor 505A and fan blades 35 via the bearing raceway. As depicted in FIG. 6, the bearing tracks (raceways) 510A and 510B sandwich the shaft 605 in the axial direction. One wall of the bearing tracks (raceways) 510A and 510B are mounted to the frame 40, e.g., fixed, and the other wall is in contact with the shaft 605 (and the rotor 505A via the shaft). The wall is configured to rotate with the shaft 605 and rotor 505A. The bearing tracks (raceways) 510A and 510B extend around the annular frame. A plurality of bearings may be located within the bearing tracks (raceways) 510A and 510B. In an aspect of the disclosure, the bearings are thrust bearings. In some aspect, fluid bearings may be used.

In an aspect of the disclosure, the raceways may be magnetic. Where magnetic raceways are used, the raceways may be connected to a power source to generate an electromagnetic field.

Since FIG. 6 is a sectional view, only four balls/rollers are shown, however, the number of balls/rollers is not limited to four.

The fan blades 35 extend inward from the shaft 200B. In an aspect of the disclosure, the fan blades 35 are integral with the shaft 200B and project inward from the shaft 200B. The shaft 200B may be attached to or formed integral with the rotor 505. In other aspects, instead of being formed integral with the shaft 200B, the fan blades 35 may attached to the shafts such that they may be able to be removed.

The fan blades 35 may be connected together or in contact with each other. For example, FIGS. 6 and 7 depict an optional center hub 600. The center hub 600 may be included for additional structural support and reduce the impact of the force 515A that the airflow 20 exerted on the fan blades 35. While not shown in FIGS. 5A and 5B, the center hub 600 may also be included in the radial alignments.

Like with the radial alignment (FIGS. 5A and 5B), the direction of the force 515A that the airflow 20 exerts is axial (downward in FIGS. 6 and 7) for the axial alignment. However, in the axial alignment, the directions of the forces 515C that the stator 500A (both parts) exert on the rotor 505A is also axial. The forces 515C are represented by two downwardly facing arrows and two upwardly facing arrows. The direction of these forces is parallel to the force 515A. The downstream portion of the stator 500A (in the direction of airflow) (shown on top in FIG. 6) exerts a force on the rotor 505A in the direction of the airflow (upward in FIG. 6). The upstream portion of the stator 500A (in the direction of airflow) (shown on the bottom in FIG. 6) exerts a force on the rotor 505A in the opposite direction.

Since the direction of forces exerted by both the airflow 20 and stator 505A (e.g., 515A and 515C) are parallel, this reduces the stress on the fan RDF 10.

FIG. 6 depicts the bearing tracks (raceways) 510A/510B positioned near the outer wall of the frame 40, e.g., offset of the rotor 505A in the radial direction. However, the position of the bearing tracks (raceways) 510A/510B is not limited to this position. For example, FIG. 7 depicts the bearing tracks (raceways) 510A/510B positioned near the inner wall of the frame 40. In FIG. 7, the shaft 605 between the rotor 505A and outer wall is eliminated and shaft 200C may be used. The bearing tracks (raceways) 510A/510B sandwich the shafts 200C in the axial direction.

Like above, the shaft 200C may be formed integral with the rotor 505A or attached thereto. The fan blades may project from the shafts 200C. FIG. 7 depicts the shaft 200C as having different thicknesses, where the thickness is the largest between the bearing tracks (raceways) 510A/510B, however, in other aspects, the shaft 200C may have the same thickness from the blades 35 to the rotor 505A.

As described above, the processor may control the switching elements to achieve a target speed for the RDF 10 by changing the frequency of switching and duty cycle. In an aspect of the disclosure, this control may be based on a temperature feedback. For example, the system may include a temperature sensor. The temperature sensor may be coupled to the processor to report the detected temperature. The temperature sensor may be installed adjacent to the engine or in the radiator 30 or radiator plenum 25. When the detected temperature rises, the processor may increase the speed of the RDF 10 and when the detected temperature falls, the processor may decrease the speed.

In other aspects of the disclosure, the control may be based on a target temperature and a deviation from the target temperature may cause the processor to change the speed of the RDF 10.

In other aspects of the disclosure, the control may be based on engine load conditions, vehicle speed and ambient temperature. For example, when a vehicle is travelling up a steep hill or the day is hot, the speed of the fan may be increased.

In each configuration, there may be a clearance between the frame 40 and the fan blade 35 such that the fan blades 35 do not rub against the housing.

The drawings are presented solely for descriptive purposes and are not to scale. The size and shapes of the components may be different than as shown in the figures. For example, the shape and size of the fan blades 35 may be different than as shown.

As used herein, the term "processor" may include a single core processor, a multi-core processor, multiple processors located in a single device, or multiple processors in wired or wireless communication with each other and distributed over a network of devices, the Internet, or the cloud. Accordingly, as used herein, functions, features or instructions performed or configured to be performed by a "processor", may include the performance of the functions, features or instructions by a single core processor, may include performance of the functions, features or instructions collectively or collaboratively by multiple cores of a multi-core processor, or may include performance of the functions, features or instructions collectively or collaboratively by multiple processors, where each processor or core is not required to perform every function, feature or instruction individually.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed is:

1. A fan comprising:
a frame,
an annular rotor rotatably mounted within the frame;
an annular support attached to or integral with the annular rotor,
a plurality of fan blades extending radially inward from the annular support, where at least a portion of the plurality of fan blades are external to the frame;
a stator mounted within the frame and configured to provide torque to rotate the annular rotor, the stator comprising a first portion and a second portion, the annular rotor being between the first portion and the second portion in an axial direction, where there is a gap between the annular rotor and each of the first portion and the second portion;
a first bearing track within the frame;
a second bearing track within the frame, a portion of the first bearing track and the second bearing track moveable with rotation of the annular rotor; and
a power terminal on the frame configured to receive power from an external power source, the received power being supplied to the stator.

2. The fan of claim 1, wherein the plurality of fan blades are removably attached to the annular support.

3. The fan of claim 1, wherein the annular rotor is offset in a radially direction from the first bearing track and the second bearing track.

4. The fan of claim 3, wherein the first bearing track and the second bearing track sandwich the annular support in the axial direction, and each of the first bearing track and the second bearing track comprises a first wall and a second wall, the first wall mounted to the frame and the second wall being in contact with the annular shaft and configured to rotate with the annular shaft.

5. The fan of claim 4, further comprising a second annular support attached to the annular rotor, the annular support and the second annular support sandwich the annular rotor in the radial direction, wherein the first bearing track and the second bearing track sandwich the second annular support in the axial direction, and each of the first bearing track and the second bearing track comprises a first wall and a second wall, the first wall mounted to the frame and the second wall being in contact with the second annular support and configured to rotate with the second annular support.

6. The fan of claim 1, wherein the first bearing track and the second bearing track have thrust bearings.

7. The fan of claim 1, wherein the first bearing track and the second bearing track are magnetic.

8. The fan of claim 1, wherein the first bearing track comprises a first wall and a second wall, and the first wall and the second wall are aligned in the axial direction.

9. The fan of claim 1, wherein the fan frame comprises a wall having an opening for the plurality of fan blades.

10. A fan comprising:
a frame,
an annular rotor rotatably mounted within the frame;
an annular support attached to or integral with the annular rotor,
a plurality of fan blades extending radially inward from the annular support, where at least a portion of the plurality of fan blades are external to the frame;
a stator mounted within the frame and configured to provide torque to rotate the annular rotor, the annular rotor being between the stator and the annular support in a radial direction;
a first bearing track within the frame;
a second bearing track within the frame, and each of the first bearing track and the second bearing track comprises a first wall and a second wall, the first wall and the second wall being aligned in the radial direction, where the first wall is in contact with the annular support and configured to rotate with the annular support and
a power terminal on the frame configured to receive power from an external power source, the received power being supplied to the stator.

11. The fan of claim 10, where the plurality of bearings are ball bearings.

12. A system for cooling an engine comprising:
a fan mounted to a frame of a radiator plenum via a fan frame, where the fan frame is mounted perpendicular to a direction of airflow, the fan frame comprising an electric motor for rotating a plurality of fan blades which are formed integral with or attached to an annular support, the annular support being attached to or formed integral with an annular rotor, the electric motor comprising the annular rotor rotatably mounted within the fan frame, the fan blades extend radially inward from the annular support and where at least a portion of the fan blades are external to the fan frame, a stator mounted to the fan frame and configured to provide torque to rotate the annular rotor using power received from a power source, where there is a gap between the stator and the annular rotor, a first bearing track within the fan frame, and a second bearing track within the fan frame, a portion of the first bearing track and the second bearing track moveable with rotation of the annular rotor and a processor configured to supply power to the stator from the power source to rotate the annular rotor, the annular support and the plurality of fan blades.

13. The system for cooling an engine of claim 12, wherein the first bearing track comprises a first wall and a second wall, and the first wall and the second wall are aligned in the direction of airflow.

14. The system for cooling an engine of claim 13, wherein the stator comprising a first portion and a second portion, the annular rotor being between the first portion and the second portion in the direction of airflow, and where there is a gap between the annular rotor and each of the first portion and the second portion.

15. The system for cooling an engine of claim 12, wherein the stator and the annular rotor are radially aligned.

16. The system for cooling an engine of claim 12, further comprising an inverter, wherein the processor is configured to control a speed of the plurality of fan blades by adjusting a frequency of switching and a duty cycle of switching a plurality of switches in the inverter.

17. The system for cooling an engine of claim 16, further comprising a temperature sensor positioned to detect a temperature of the engine or radiator plenum, wherein the processor is configured to receive the temperature detected by the temperature sensor and adjust the frequency of switching and the duty cycle based on the detected temperature.

18. The system for cooling an engine of claim 12, wherein the system in installed in a hybrid electric vehicle or an electric vehicle.

19. The system for cooling an engine of claim 16, wherein the inverter is electrically connected to an energy storage system, where the energy storage system supplies power to a DC bus.

* * * * *